(12) United States Patent
Solanki et al.

(10) Patent No.: US 11,956,213 B2
(45) Date of Patent: Apr. 9, 2024

(54) USING FIREWALL POLICIES TO MAP DATA MESSAGES TO SECURE TUNNELS

(71) Applicant: VMware LLC, Palo Alto, CA (US)

(72) Inventors: Deepika Kunal Solanki, Pune (IN); Yong Wang, San Jose, CA (US)

(73) Assignee: VMware LLC, Palo Alto, CA (US)

(*) Notice: Subject to any disclaimer, the term of this patent is extended or adjusted under 35 U.S.C. 154(b) by 0 days.

(21) Appl. No.: 17/747,969

(22) Filed: May 18, 2022

(65) Prior Publication Data
US 2023/0396587 A1    Dec. 7, 2023

(51) Int. Cl.
*H04L 29/06* (2006.01)
*H04L 9/40* (2022.01)
*H04L 12/46* (2006.01)

(52) U.S. Cl.
CPC ...... *H04L 63/0263* (2013.01); *H04L 12/4633* (2013.01); *H04L 63/029* (2013.01); *H04L 63/061* (2013.01)

(58) Field of Classification Search
USPC .......................................................... 726/1
See application file for complete search history.

(56) References Cited

U.S. PATENT DOCUMENTS

| | | | |
|---|---|---|---|
| 6,330,562 B1 | 12/2001 | Boden et al. | |
| 6,968,441 B1 | 11/2005 | Schnee | |
| 7,003,118 B1 | 2/2006 | Yang et al. | |
| 7,243,225 B2 | 7/2007 | Poeluev et al. | |
| 7,284,111 B1 | 10/2007 | Sae-Koe | |
| 7,373,660 B1 | 5/2008 | Guichard et al. | |
| 7,383,353 B2 | 6/2008 | Valdevit et al. | |
| 7,555,544 B1 | 6/2009 | Rattner et al. | |
| 7,814,310 B2 | 10/2010 | Bouchard et al. | |
| 7,962,358 B1 | 6/2011 | Fernandez et al. | |

(Continued)

FOREIGN PATENT DOCUMENTS

| | | |
|---|---|---|
| CA | 2870048 A1 | 11/2013 |
| CN | 102801695 A | 11/2012 |

(Continued)

OTHER PUBLICATIONS

Barker, Elaine, et al., "Guide to IPsec VPNs," NIST SP 800-77 Rev. 1, Jun. 30, 2020, 166 pages, retrieved from https://csrc.nist.gov/publications/detail/sp/800-77/rev-1/final.

(Continued)

*Primary Examiner* — Sanchit K Sarker
(74) *Attorney, Agent, or Firm* — Quarles & Brady LLP

(57) ABSTRACT

Some embodiments of the invention provide a method for transmitting data messages via secure tunnels in a network. The method is performed at a gateway device. The method determines that a data message received at the gateway device should be sent via a secure interface of the gateway device. The method matches the data message to a firewall rule that maps to a particular secure tunnel used by the secure interface, with multiple different firewall rules mapping to multiple different secure tunnels used by the secure interface. The method encapsulates the data message with a header that comprises an indicator value specifying the particular secure tunnel and forwards the encapsulated data message to a destination interface.

20 Claims, 6 Drawing Sheets

(56) References Cited

U.S. PATENT DOCUMENTS

| | | | |
|---|---|---|---|
| 8,549,300 B1* | 10/2013 | Kumar | H04L 9/3263 |
| | | | 713/168 |
| 8,566,452 B1 | 10/2013 | Goodwin, III et al. | |
| 9,483,286 B2 | 11/2016 | Basavaiah et al. | |
| 9,535,750 B1 | 1/2017 | Wilkes et al. | |
| 9,588,813 B1 | 3/2017 | Dubey et al. | |
| 9,755,972 B1 | 9/2017 | Mao et al. | |
| 9,813,379 B1 | 11/2017 | Shevade et al. | |
| 9,929,970 B1 | 3/2018 | Matthews et al. | |
| 10,020,984 B1 | 7/2018 | Jork et al. | |
| 10,257,167 B1 | 4/2019 | Matthews et al. | |
| 10,491,466 B1 | 11/2019 | Hira et al. | |
| 10,498,529 B1 | 12/2019 | Hashmi et al. | |
| 10,498,708 B2 | 12/2019 | Wang et al. | |
| 10,601,779 B1 | 3/2020 | Matthews et al. | |
| 10,623,372 B2 | 4/2020 | Wang et al. | |
| 10,701,107 B2 | 6/2020 | Gopal et al. | |
| 10,742,601 B2* | 8/2020 | Xie | H04L 63/0227 |
| 11,075,888 B2 | 7/2021 | Jain et al. | |
| 11,095,617 B2 | 8/2021 | Jain et al. | |
| 11,347,561 B1 | 5/2022 | Kumar et al. | |
| 11,729,153 B2 | 8/2023 | Jain et al. | |
| 2002/0010866 A1 | 1/2002 | McCullough et al. | |
| 2002/0097724 A1 | 7/2002 | Halme et al. | |
| 2003/0088787 A1 | 5/2003 | Egevang | |
| 2004/0143734 A1 | 7/2004 | Buer et al. | |
| 2005/0165953 A1 | 7/2005 | Oba et al. | |
| 2005/0198531 A1 | 9/2005 | Kaniz et al. | |
| 2005/0213603 A1 | 9/2005 | Karighattam et al. | |
| 2006/0002388 A1 | 1/2006 | Grebus et al. | |
| 2006/0029278 A1 | 2/2006 | Alasia et al. | |
| 2006/0227807 A1 | 10/2006 | Jakubik et al. | |
| 2008/0123593 A1 | 5/2008 | Fujita et al. | |
| 2008/0144625 A1 | 6/2008 | Wu et al. | |
| 2008/0165964 A1 | 7/2008 | Lewis et al. | |
| 2008/0307024 A1 | 12/2008 | Michaels et al. | |
| 2009/0122990 A1 | 5/2009 | Gundavelli et al. | |
| 2009/0231999 A1 | 9/2009 | Verma et al. | |
| 2010/0138560 A1 | 6/2010 | Kivinen et al. | |
| 2010/0191958 A1 | 7/2010 | Chen | |
| 2010/0217949 A1 | 8/2010 | Schopp et al. | |
| 2011/0035740 A1* | 2/2011 | Powell | G06F 8/65 |
| | | | 717/170 |
| 2011/0113236 A1 | 5/2011 | Chenard et al. | |
| 2012/0027002 A1 | 2/2012 | Jones et al. | |
| 2012/0027314 A1 | 2/2012 | Lee et al. | |
| 2012/0102278 A1 | 4/2012 | Joffray et al. | |
| 2012/0124591 A1 | 5/2012 | Cadambi et al. | |
| 2012/0170459 A1 | 7/2012 | Olesinski et al. | |
| 2012/0303949 A1 | 11/2012 | Liu et al. | |
| 2014/0089480 A1 | 3/2014 | Zhu | |
| 2014/0108665 A1 | 4/2014 | Arora et al. | |
| 2014/0313932 A1 | 10/2014 | Saltsidis | |
| 2015/0052525 A1 | 2/2015 | Raghu | |
| 2015/0195138 A1 | 7/2015 | Horman | |
| 2015/0363240 A1 | 12/2015 | Koizumi | |
| 2016/0057108 A1 | 2/2016 | Hu | |
| 2016/0088072 A1 | 3/2016 | Likhtarov et al. | |
| 2016/0135074 A1 | 5/2016 | Welin et al. | |
| 2016/0182509 A1 | 6/2016 | Kantecki et al. | |
| 2016/0212098 A1 | 7/2016 | Roch | |
| 2016/0226815 A1 | 8/2016 | Wan et al. | |
| 2016/0277478 A1 | 9/2016 | Narasimhamurthy | |
| 2016/0352628 A1 | 12/2016 | Reddy et al. | |
| 2017/0024293 A1 | 1/2017 | Bell et al. | |
| 2017/0054603 A1 | 2/2017 | Kulkarni et al. | |
| 2017/0063787 A1 | 3/2017 | Kwok et al. | |
| 2017/0063979 A1 | 3/2017 | Saeki | |
| 2017/0331724 A1 | 11/2017 | Carney | |
| 2017/0374025 A1 | 12/2017 | Pan | |
| 2018/0054458 A1 | 2/2018 | Marck et al. | |
| 2018/0062875 A1 | 3/2018 | Tumuluru | |
| 2018/0067786 A1 | 3/2018 | Trung et al. | |
| 2018/0092140 A1* | 3/2018 | Dong | H04W 76/12 |
| 2018/0131521 A1 | 5/2018 | Yang et al. | |
| 2018/0176124 A1 | 6/2018 | Kancherla et al. | |
| 2018/0241655 A1 | 8/2018 | Tsirkin | |
| 2018/0262598 A1* | 9/2018 | Zhang | H04L 12/4633 |
| 2019/0114206 A1 | 4/2019 | Murugesan et al. | |
| 2019/0173850 A1* | 6/2019 | Jain | H04L 9/088 |
| 2019/0173851 A1 | 6/2019 | Jain et al. | |
| 2019/0190892 A1 | 6/2019 | Menachem et al. | |
| 2019/0266217 A1 | 8/2019 | Arakawa et al. | |
| 2019/0306086 A1 | 10/2019 | Boutros et al. | |
| 2019/0372936 A1 | 12/2019 | Sullenberger et al. | |
| 2020/0059457 A1 | 2/2020 | Raza et al. | |
| 2020/0099670 A1 | 3/2020 | Kessler et al. | |
| 2020/0186507 A1 | 6/2020 | Dhanabalan et al. | |
| 2020/0351254 A1 | 11/2020 | Xiong et al. | |
| 2020/0403922 A1 | 12/2020 | Yu et al. | |
| 2021/0021523 A1 | 1/2021 | Wang et al. | |
| 2021/0036887 A1* | 2/2021 | Meng | H04L 45/22 |
| 2021/0136049 A1 | 5/2021 | Wang et al. | |
| 2021/0185025 A1 | 6/2021 | Wang et al. | |
| 2021/0377232 A1 | 12/2021 | Jain et al. | |
| 2021/0385203 A1 | 12/2021 | Wang et al. | |
| 2021/0392121 A1 | 12/2021 | Thangapandi et al. | |
| 2021/0400029 A1 | 12/2021 | Wang et al. | |
| 2022/0191139 A1 | 6/2022 | Dutta | |
| 2022/0191145 A1 | 6/2022 | Duraj et al. | |
| 2022/0291970 A1 | 9/2022 | Kumar et al. | |
| 2022/0393967 A1 | 12/2022 | Solanki et al. | |
| 2022/0393981 A1 | 12/2022 | Solanki et al. | |
| 2022/0394014 A1 | 12/2022 | Wang et al. | |
| 2022/0394016 A1 | 12/2022 | Solanki et al. | |
| 2022/0394017 A1 | 12/2022 | Solanki et al. | |
| 2023/0118718 A1 | 4/2023 | Solanki et al. | |
| 2023/0231826 A1 | 7/2023 | Pawar | |

FOREIGN PATENT DOCUMENTS

| | | |
|---|---|---|
| CN | 110677426 A | 1/2020 |
| KR | 20030013496 A | 2/2003 |
| WO | 2016020727 A1 | 2/2016 |
| WO | 2016049609 A1 | 3/2016 |
| WO | 2022260711 A1 | 12/2022 |

OTHER PUBLICATIONS

Kim, Joongi, et al., "NBA (Network Balancing Act): A High-performance Packet Processing Framework for Heterogeneous Processors," EuroSys '15, Apr. 21-24, 2015, 14 pages, ACM, Bordeaux, France.

Muramatsu, Shin, et al., "VSE: Virtual Switch Extension for Adaptive CPU Core Assignment in softirq," 2014 IEEE 6th International Conference on Cloud Computing Technology and Science, Dec. 15-18, 2014, 6 pages, IEEE, Singapore.

Non-Published Commonly Owned U.S. Appl. No. 17/570,362, filed Jan. 6, 2022, 85 pages, VMware, Inc.

Non-Published Commonly Owned U.S. Appl. No. 17/570,363, filed Jan. 6, 2022, 87 pages, VMware, Inc.

Non-Published Commonly Owned U.S. Appl. No. 17/570,364, filed Jan. 6, 2022, 86 pages, VMware, Inc.

Non-Published Commonly Owned U.S. Appl. No. 17/570,365, filed Jan. 6, 2022, 85 pages, VMware, Inc.

Non-Published Commonly Owned U.S. Appl. No. 17/570,366, filed Jan. 6, 2022, 86 pages, VMware, Inc.

Non-Published Commonly Owned U.S. Appl. No. 17/715,510, filed Apr. 7, 2022, 34 pages, VMware, Inc.

Non-Published Commonly Owned U.S. Appl. No. 17/827,889, filed May 30, 2022, 42 pages, VMware, Inc.

Son, Jeongseok, et al., "Protego: Cloud-Scale Multitenant IPsec Gateway," Proceedings of the 2017 USENIX Annual Technical Conference (USENIX ATC '17), Jul. 12-14, 2017, 15 pages, USENIX Association, Santa Clara, CA.

Non-Published Commonly Owned U.S. Appl. No. 18/224,558, filed Jul. 20, 2023, 51 pages, Nicira, Inc.

* cited by examiner

USING FIREWALL POLICIES TO MAP DATA MESSAGES TO SECURE TUNNELS

BACKGROUND

Today, site-to-site virtual private network (VPN) configuration can be done with policy-based VPNs or route-based VPNs. The policy-based VPN relies on a policy defined by, for example, a system administrator, and the VPN configuration may be changed only if the policy is changed. As such, the policy-based VPN is difficult to dynamically modify and scale up, and the rules supported are limited to IP/Port/Protocol-based rules. In contrast, route-based VPN uses routing to decide which traffic needs to be protected and directed to a virtual tunnel interface (VTI). Since the route-based VPN supports dynamic routing protocols, it enables dynamic modification of the definitions of the protected traffic, and thus provides scalability. Additionally, the route-based VPN provides some benefits that are not provided by the policy-based VPN. For example, without reconfiguring the VPN, but based on dynamically updated Border Gateway Protocol (BGP) configuration data, the route-based VPN can dynamically modify the definitions of the protected traffic, and also supports high availability via routing.

However the route-based VPN also suffers from some performance issues, such as limited throughput. A packet sending gateway typically uses one VPN tunnel to transmit the protected traffic, but, if the traffic directed to the VPN tunnel exceeds the tunnel capacity, then some packets are dropped as the tunnel's throughput is limited. Additionally, other issues such as CPU balancing issues occur and a selected CPU may become overloaded while other CPUs may be underutilized.

BRIEF SUMMARY

Some embodiments of the invention provide a method for transmitting data messages via secure tunnels in a network. The method of some embodiments is performed by a gateway device (e.g., an edge gateway device). The method determines that a data message received at the gateway device should be sent via a secure interface of the gateway device (e.g., a virtual tunnel interface (VTI)). From multiple different firewall rules that map to multiple different secure tunnels used by the secure interface, the method matches the data message to a firewall rule that maps to a particular secure tunnel. The method then encapsulates the data message with a header that includes an indicator value (e.g., a security parameter index (SPI)) specifying the particular secure tunnel and forwards the encapsulated data message to a destination interface (e.g., a destination VTI of a destination gateway device).

In some embodiments, the network is implemented by an underlying physical infrastructure of wired and/or wireless communications mediums, routers, switches, etc., and, in some embodiments, may include the Internet, as well as any direct connections between the gateway devices. In some embodiments, the direct connections may refer to interconnections between network endpoints within a same datacenter and/or a same physical device, or other proprietary network connection interconnecting the gateway devices. The connections of some embodiments are established using Internet Protocol Security (IPsec). IPsec is a group of protocols that are used together to set up encrypted connections between devices such that private data can be securely sent over public networks. In some embodiments, IPsec is used to set up Virtual Private Networks (VPNs) by encrypting IP data messages and authenticating the source of the data messages. IPsec VPNs can be used by enterprises to interconnect geographically dispersed branch office locations across a Wide Area Network (WAN) (e.g., the Internet), as well as by cloud providers to encrypt IP traffic traversing datacenter interconnect WAN so as to meet the security and compliance requirements (e.g., in financial cloud and governmental cloud environments).

In some embodiments, the destination interface includes multiple different security associations (SAs) for processing data messages, with the different secure tunnels corresponding to the different SAs. Each SA, in some embodiments, is defined for processing data messages matching one or more firewall rules that map to the corresponding secure tunnels. In some embodiments, each SA performs one or more actions on received data messages according to the one or more firewall rules matching the received data messages. As such, the data message of some embodiments is received at the destination interface by a particular SA to which the particular secure tunnel maps. At the destination interface, any actions (e.g., decapsulation and/or decryption) specified by the particular SA are performed on the data message.

The source gateway device matches the data message to the firewall rule by matching a set of attributes (e.g., a set of message header values) of the data message to corresponding attributes specified by the firewall rule. Examples of such attributes include source and destination MAC addresses, source and destination IP addresses, source and destination port numbers, source and destination machine tags, and user identifiers, among others. In some embodiments, such as when the network is a cloud network (e.g., public or private cloud network), the attribute is a cloud service provider associated with a source and/or destination of the data message.

At time of setup, the source and destination gateway devices receive the firewall rules from a network manager in some embodiments. During an Internet key exchange (IKE) session, the source and destination gateway devices then negotiate multiple IPsec rules and integrate the received firewall rules with the IPsec rules. Additionally, during the IKE session, the source and destination gateway devices negotiate the secure tunnels and the SAs and map (1) the different firewall rules to the different secure tunnels as well as (2) the different secure tunnels to the different SAs.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings, and the Claims is needed. Moreover, the claimed subject matters are not to be limited by the illustrative details in the Summary, the Detailed Description, and the Drawings.

BRIEF DESCRIPTION OF FIGURES

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method for transmitting data messages via secure tunnels in a network. The method of some embodiments is performed by a gateway device (e.g., an edge gateway device). The method determines that a data message received at the gateway device should be sent via a secure interface of the gateway device (e.g., a virtual tunnel interface (VTI)). From multiple different firewall rules that map to multiple different secure tunnels used by the secure interface, the method matches the data message to a firewall rule that maps to a particular secure tunnel. The method then encapsulates the data message with a header that includes an indicator value (e.g., a security parameter index (SPI)) specifying the particular secure tunnel, and forwards the encapsulated data message to a destination interface (e.g., a destination VTI of a destination gateway device).

Figure 1:
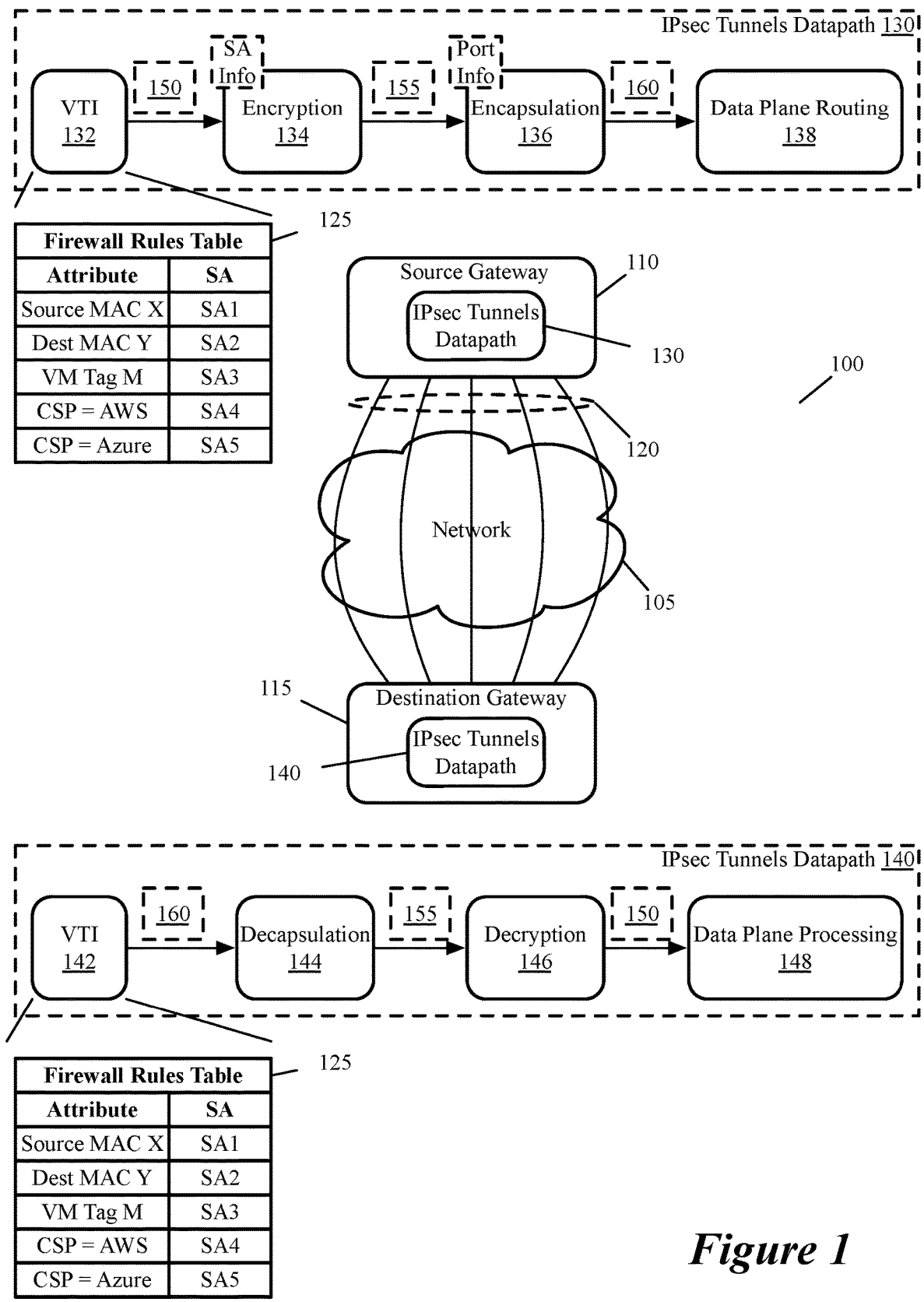
FIG. 1 conceptually illustrates a diagram of the datapath at source and destination gateway devices that are connected over a network, in some embodiments.

FIG. 1 conceptually illustrates a diagram of the datapath at source and destination gateway devices that are connected over a network according to some embodiments. As illustrated, the diagram 100 includes a source gateway 110 having multiple paths 120 over a network 105 to a destination gateway 115. In some embodiments, the network 105 is implemented by an underlying physical infrastructure of wired and/or wireless communications mediums, routers, switches, etc., and, in some embodiments, may include the Internet, as well as any direct connections between the gateway devices 110 and 115. In some embodiments, the direct connections may refer to interconnections between network endpoints within a same datacenter and/or a same physical device, or other proprietary network connection interconnecting the gateway devices 110 and 115.

In some embodiments, connections using the paths 120 are established using Internet Protocol Security (IPsec). IPsec is a group of protocols that are used together to set up encrypted connections between devices such that private data can be securely sent over public networks. In some embodiments, IPsec is used to set up Virtual Private Networks (VPNs) by encrypting IP data messages and authenticating the source of the data messages. In some embodiments, one or more of the paths 120 are through a VPN tunnel (not shown) between the source and destination gateways 110 and 115. IPsec VPNs can be used by enterprises to interconnect geographically-dispersed branch office locations across a Wide Area Network (WAN) (e.g., the Internet), as well as by cloud providers to encrypt IP traffic traversing datacenter interconnect WAN so as to meet the security and compliance requirements (e.g., in financial cloud and governmental cloud environments).

The source gateway 110 includes IPsec tunnels datapath 130, as shown. In some embodiments, each of the gateways 110 and 115 also includes an Internet key exchange (IKE) control stack (not shown). The IKE-control stack is a submodule of the VPN control plane, while the IPsec tunnels datapaths 130 and 140 represent the VPN dataplane. In some embodiments, these modules are modules of software instructions being executed by one or more processing units (e.g., a processor) of a computing device. In some embodiments, the modules are modules of hardware circuits implemented by one or more integrated circuits (ICs) of an electronic apparatus. The modules (i.e., IKE-control stack and IPsec tunnels datapath) are separate modules, in some embodiments, while in other embodiments, some of the modules can be combined into a single module.

In some embodiments, the IKE control stack (not shown) controls the operations of IPsec, including establishing and maintaining VPN sessions and security associations (SAs). The IKE control stacks provide the necessary key data to IPsec tunnels datapaths 130 and 140 for authenticating and encrypting payloads (e.g., SA information, SA group object information, and port information for encapsulation). The IPsec tunnels datapaths 130 and 140 perform the operations of the individual VPN tunnels, in some embodiments, and are responsible for path selection, as will be described further below.

The IPsec tunnels datapath 130 performs the operations of the individual VPN tunnels (i.e., one or more of the paths 120). In some embodiments, the source gateway 110 also includes a traffic analyzer (not shown) to which the IPsec tunnels datapath 130 provides traffic statistics of the tunnels. In some embodiments, The IPsec tunnels datapath 130 may include various VPN data plane modules. The IPsec tunnels datapath 130 also performs encryption and authentication of payloads based on the SA information provided by an IKE control stack (not shown) of the source gateway 110. In some embodiments, the IPsec tunnels datapath 130 also encapsulates encrypted payloads in UDP headers that include UDP port numbers based on a path identified for a data message (e.g., based on the firewall rules table 125).

An SA is the establishment of shared security attributes between two network entities (e.g., between a pair of gateways of different datacenters, or between two network endpoints) to support secure communication (e.g., a VPN connection/tunnel). An SA may correspond to a one-way or simplex connection. An SA may include attributes such as cryptographic algorithm and mode, traffic encryption key, and parameters for the network data to be passed over the connection. An SA is a form of contract between the two network entities detailing how to exchange and protect information among each other, including indicating how to encrypt/decrypt data. Each SA may include a mutually agreed-upon key, one or more secure protocols, and an SPI value identifying the SA, among other data.

The IPsec tunnels datapath 130 includes a VTI 132, an encryption module 134, an encapsulation module 136, and a data plane routing module 138. When a data message's source (e.g., source application, source machine, etc.) uses the gateway 110 to send certain data using a VPN session between the gateway 110 and the gateway 115, the IPsec tunnels datapath 130 receives the data at the routing interface VTI 132. The VTI 132 uses the firewall rules table 125 to identify an SA for the data message. As illustrated, the firewall rules table 125 lists attributes along with SAs corresponding to those attributes. For example, SA1 is specified for data messages having source MAC address X, SA2 is specified for data messages with destination MAC address Y, SA3 is specified for data messages with VM tag M, SA4 is specified for data messages tagged with an identifier for the cloud service provider (CSP) AWS, and lastly SA5 is specified for data messages tagged with an identifier for the CSP Azure.

It should be noted that while communications in the diagram 100 are illustrated and described as flowing from gateway 110 to gateway 115, communications can also flow from gateway 115 to gateway 110, according to some embodiments, and the firewall rules 125 at the destination gateway 115 can be used to map to SAs at the source gateway 110. Also, in some embodiments, the firewall rules for a source may differ from the firewall rules for a destination in that the matching is reversed. For instance, a firewall for a source gateway may be specified for data messages with a source IP "A" and a destination IP "B", while the corresponding firewall rule for a destination gateway may be specified for data messages with a source IP "B" and a destination IP "A". Additionally, the firewall rules in some embodiments can also include firewall rules defined to match different IP sets, groups of IP sets, and security groups. For instance, in some embodiments, a firewall rule may be defined for IP addresses corresponding to a particular set of machines that belong to the same security group.

Once the appropriate SA is identified for the data message, the data is packaged as an inner packet 150. An encryption module 134 encrypts the inner packet into an IPsec encrypted packet 155 according to the encryption parameters of the SA information provided by the VTI 132 from the table 125. The encryption module 134 also appends other IPsec-related fields based on the SA information (e.g., ESP header, ESP trailer, ESP authentication, new IP, etc.). An encapsulation module 136 then encapsulates the IPsec encrypted packet 155 as a UDP encapsulated packet 160 with a UDP encapsulation header, which may include UDP port number that is used to indicate the selected path (i.e., the path to which the matching firewall rule and selected SA map). A data plane routing module 138 then sends the UDP encapsulated data message 160 via the selected path/tunnel 120.

The destination gateway 115 also includes an IPsec tunnels datapath 140. When a data message is received at the destination gateway 115, the data message is decapsulated and decrypted according to the selected SA (i.e., the SA associated with the tunnel through which the data message was sent). Similar to the IPsec tunnels datapath 130 for egress data messages, the VTI 142 of the IPsec tunnels datapath 140 passes the UDP encapsulated data message 160 to the decapsulation module 144, which decapsulates the data message and provides the encrypted data message 155 to the decryption module 146. The decryption module 146 then decrypts the data message according to the selected SA and provides the decapsulated and decrypted data message 150 to the data plane processing module 148.

Different flows of a same SA may be processed by different processing cores. Specifically, a first set of flow identifiers of a first flow including a first UDP port number may be hashed to select a first processor core for decrypting the first data message, and a second set of flow identifiers of a second flow including a second UDP port number may be hashed to select a second, different processor core for decrypting the second data message. Flows of different SAs may also be processed by different processing cores, even when the flows have the same IP addresses and UDP ports. Specifically, a first set of flow identifiers of a first flow including a first SPI may be hashed to select a first processor core for decrypting the first data message, and a second set of flow identifiers of a second flow including a second, different SPI may be hashed to select a second, different processor core for decrypting the second data message.

Figure 2:
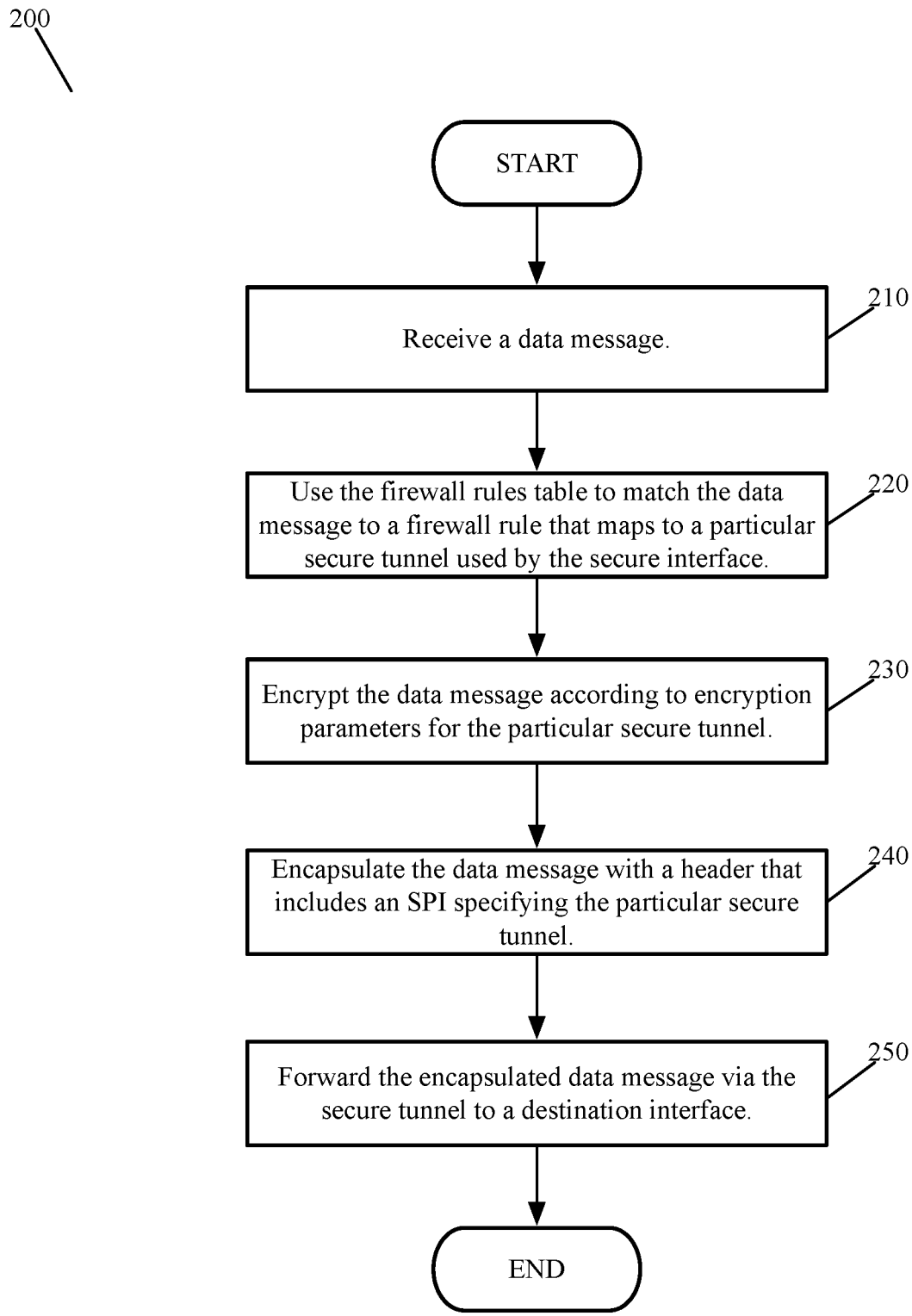
FIG. 2 conceptually illustrates a process of some embodiments for processing and forwarding an egress data message at a gateway device.

FIG. 2 conceptually illustrates a process 200 of some embodiments for processing and forwarding an egress data message using a secure interface at a gateway device. The process 200 is performed by components of the gateway device, such as the IPsec tunnels datapath 130 described above. The process 200 starts when it receives (at 210) a data message. For instance, the gateway 110 receives data messages originating from an endpoint (e.g., host computer, virtual machine (VM), data compute node (DCN), etc.) operating in the same datacenter as the gateway 110.

The process 200 uses (at 220) a firewall rules table to match the data message to a firewall rule that maps to a particular secure tunnel used by the secure interface. For instance, the VTI 132 in the diagram 100 described above uses the firewall rules table 125, which includes a list of attributes and SAs designated for data messages matching those attributes. Each of the SAs has a corresponding secure tunnel, according to some embodiments. In some embodiments, one SA may match to multiple different attributes, while in other embodiments, each SA is designated for a particular attribute.

Once a matching firewall rule has been identified, the process 200 encrypts (at 230) the data message according to encryption parameters for the particular secure tunnel. As discussed above, each secure tunnel is associated with a particular SA. In some embodiments, each SA may include attributes such as cryptographic algorithm and mode, traffic encryption key, and parameters for the data to be passed over a connection to the destination gateway. As an SA is a form of contract between two network entities detailing how to exchange and protect information among each other, parameters for how to encrypt/decrypt data can also be specified for each SA, according to some embodiments. Each SA may include a mutually agreed-upon key, one or more secure protocols, and an SPI value identifying the SA, among other data. Accordingly, an inner packet of the data message of some embodiments is encrypted according to the SA corresponding to the particular secure tunnel.

The process 200 next encapsulates (at 240) the data message with a header that includes an SPI specifying the particular secure tunnel (and the corresponding SA). Because the inner packet of the data message is encrypted, any network address specified by the inner packet cannot be used to route the packet, and thus the SPI for the secure tunnel and SA is encapsulated in a header of the data message in order for the data message to be able to reach its intended destination. In some embodiments, each SA has a different SPI value associated therewith, and the tuples of header values of data messages communicated across the different VPN tunnels may hash to different CPUs at the destination gateway for processing. The SPI values of some embodiments are also used as flow identifiers.

The process 200 forwards (at 250) the encapsulated data message via the secure tunnel to a destination interface. For instance, the data plane routing module 138 receives the encapsulated data message 160 from the encapsulation module 136 and forwards the data message via the selected secure tunnel to the destination gateway 115. After forwarding the data message at 250, the process 200 ends.

Figure 3:
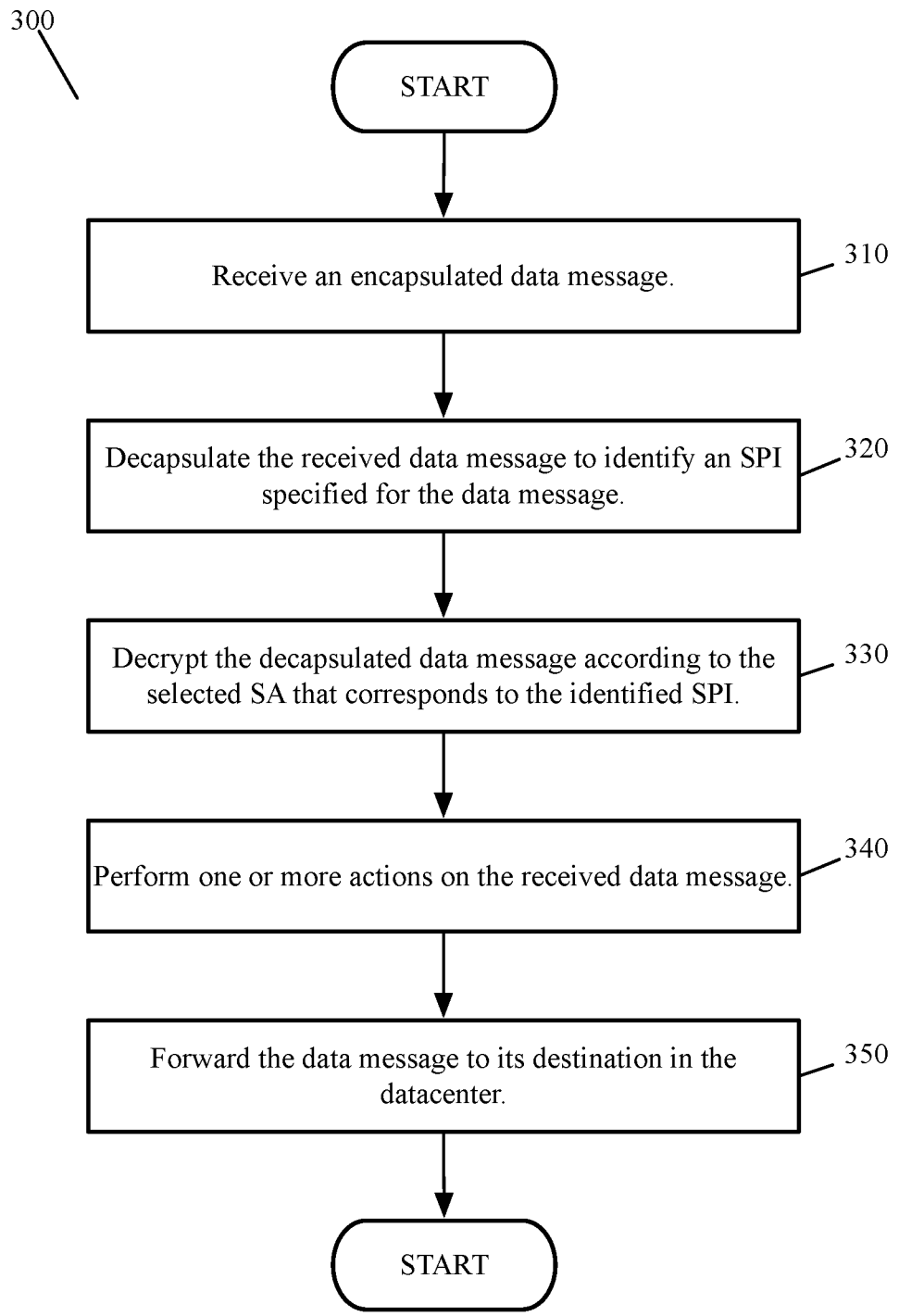
FIG. 3 conceptually illustrates a process performed in some embodiments at a destination gateway upon receiving a data message.

FIG. 3 conceptually illustrates a process 300 performed at the destination gateway upon receiving a data message. The process 300 is performed by components of a destination gateway device, such as the IPsec tunnels datapath 140 described above. The process 300 starts by receiving (at 310) an encapsulated data message. For instance, the VTI 142 of the IPsec tunnels datapath 140 receives data messages for the gateway 115 from the gateway 110 in the diagram 100 via a tunnel 120.

The process 300 decapsulates (at 320) the data message to identify an SPI specified for the data message. The SPI is used to identify the appropriate SA for processing the data message. More specifically, in some embodiments, the SPI is used to determine which CPU to use for decrypting the data message as the inner packet data of the data message is encrypted and thus cannot be used for this determination. In the diagram 100, for example, the decapsulation module 144 receives data messages from the VTI 142 and decapsulates these received data messages.

The process 300 next decrypts (at 330) the decapsulated data message according to the selected SA that corresponds to the identified SPI. Referring again to the diagram 100, after decapsulating a data message, the decapsulation module 144 provides the decapsulated data message to the decryption module 146, which decrypts the payload (i.e., inner packet) of the data message in accordance with the SPI identified in the header of the data message during decapsulation.

The process 300 performs (at 340) one or more actions on the decrypted data message. This additional processing is performed in some embodiments by the data plane processing module 148, which receives the decrypted data message from the decryption module 146. In some embodiments, the actions that may be performed on the data message are performed according to the matching firewall rule and/or other IPsec rules and policies that may be applicable to the data message or the selected SA. For instance, in some embodiments, a network address translation (NAT) operation may be performed on the data message.

The process 300 then forwards (at 350) the data message to its destination in the datacenter. In the diagram 100, for example, the data plane processing module 148 forwards data messages to their destinations after performing any additional processing required in step 340 above. In some embodiments, the data message may be destined to a particular server in the same datacenter as the gateway device in order to access resources of the particular server. Also, in some embodiments, the destination gateway may be a VPN server and the data messages are destined to the VPN server. Following 350, the process 300 ends.

Figure 4:
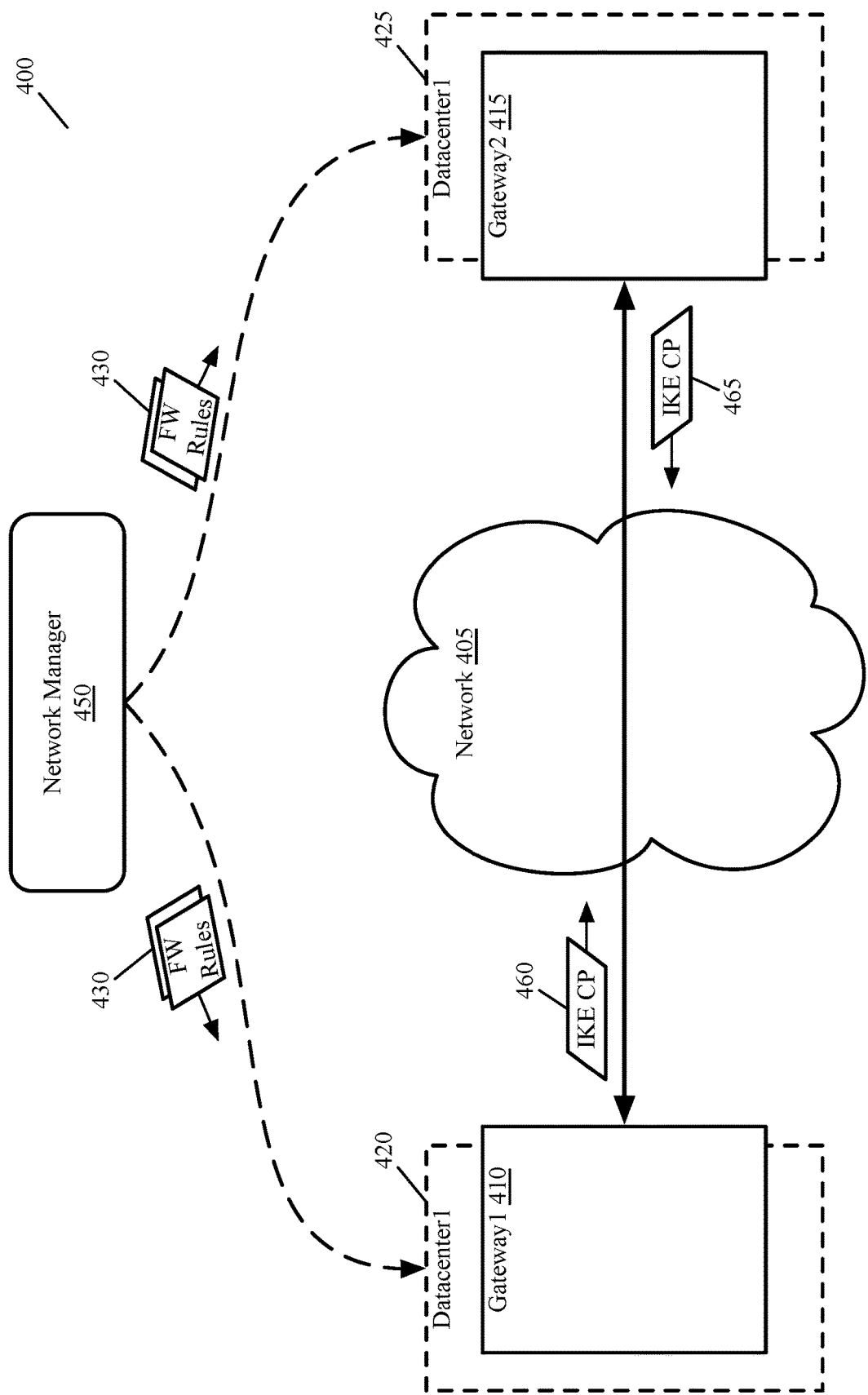
FIG. 4 conceptually illustrates an IKE session of some embodiments between a source gateway and a destination gateway.

FIG. 4 conceptually illustrates an IKE session 400 between a source gateway 410 and a destination gateway 415. In some embodiments, the IKE session 400 is used for establishing a VPN session between the datacenters 420 and 425. IKE is the protocol used to set up a secure, authenticated communications channel between two parties. IKE typically uses public key infrastructure certificates for authentication and the key exchange protocol to set up a shared session secret. IKE is part of the IPsec, which is responsible for negotiating the SAs, which are a set of mutually agreed-upon keys and algorithms to be used by both parties trying to establish a VPN connection/tunnel.

Before the IKE session 400 is initiated, the source and destination gateways 410 and 415 receive, at their respective datacenters 420 and 425, firewall rules 430 from the network manager 450. The firewall rules 430, in some embodiments, are defined for use in the datacenters 420 and 425 and may be used to micro-segment security policies of IPsec SAs that are to be negotiated. The firewall rules 430, in some embodiments, may include one or more actions to be performed on data messages that match to the firewall rules. During the IKE session 400, the gateways 410 and 415 establish an IPsec tunnel using the IKE protocol. The IPsec tunnel is then used by the gateways 410 and 415 to negotiate encryption, authentication, and other protocols and other parameters (e.g., SAs), as illustrated by the control messages 460 and 465. The gateway 410 may use multiple addresses of local endpoints in the datacenter 420 to establish multiple SAs and IPsec tunnels.

The network 405, in some embodiments, is implemented by an underlying physical infrastructure of wired and/or wireless communications mediums, routers, switches, etc., and, in some embodiments, may include the Internet, as well as any direct connections between the gateways 410 and 415. In some embodiments, the direct connections may refer to interconnections between network endpoints within a same datacenter and/or a same physical device, or other proprietary network connection interconnecting the gateways 410 and 415. Once the IKE session is completed and all of the necessary parameters have been negotiated, the gateways 410 and 415 can continue to communicate using the established VPN session, according to some embodiments.

Figure 5:
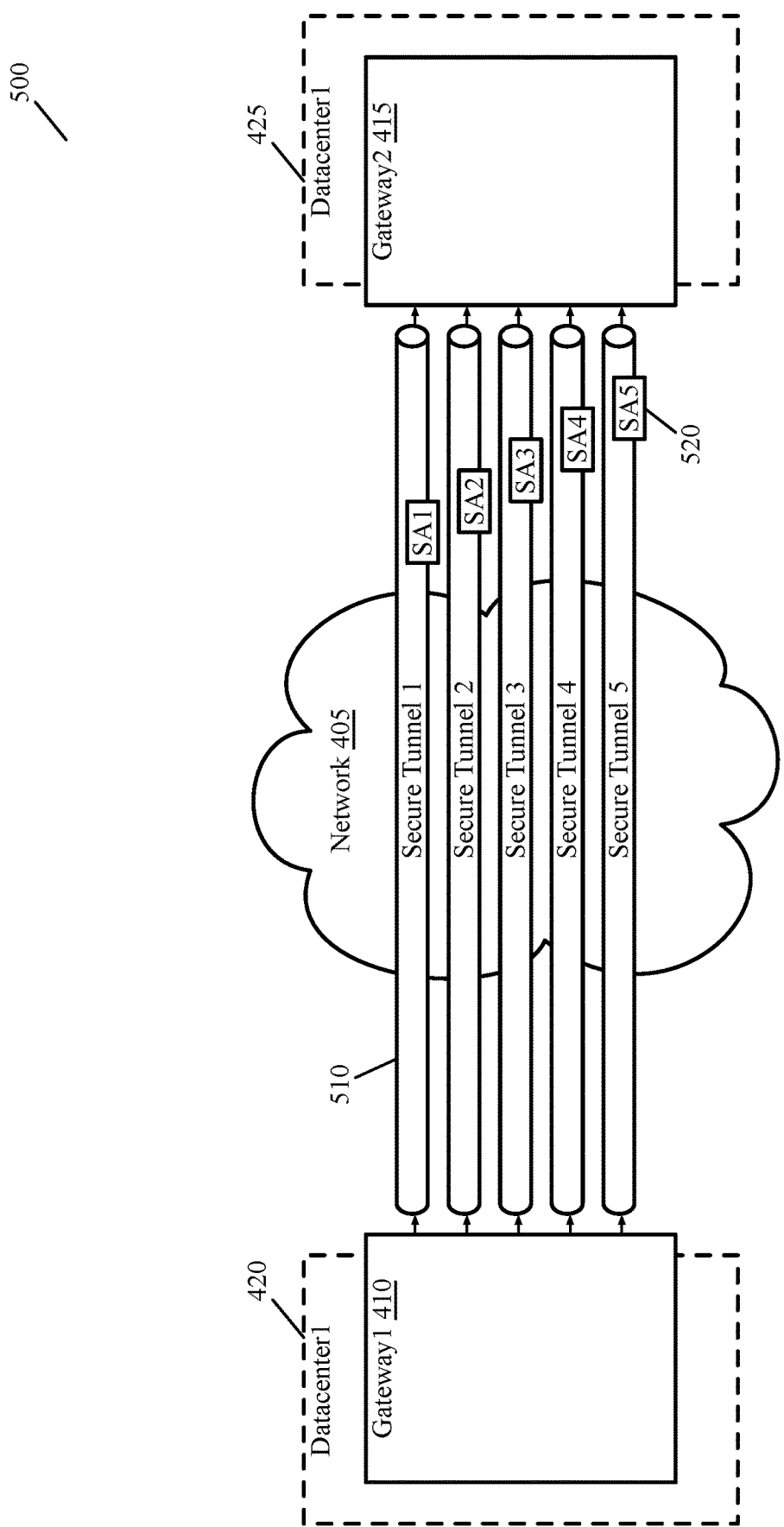
FIG. 5 conceptually illustrates a VPN session of some embodiments between gateways at different datacenters.

FIG. 5 conceptually illustrates a VPN session 500 between the gateways 410 and 415. The VPN session 500 is used in some embodiments to securely transport or migrate data from the first datacenter 420 to the second datacenter 425. The VPN session 500 uses multiple IPsec tunnels 510 and multiple SAs 520 established during the IKE session 400, and the gateway 410 manages the VPN session 500 and the multiple IPsec tunnels 510. The gateway 410 may use the VPN session 500 to transport IPsec data on behalf of network endpoints of the first datacenter 420. In some embodiments, the gateway 410 of the first datacenter 420 may be a VPN client and the gateway 415 of the second datacenter 425 may be a VPN server. The paths connecting the two datacenters may support one or more active uplinks from the VPN client to the VPN server.

Rather than relying on other methods, such as simple ECMP, to perform path selection based on fixed outer IP addresses, the gateway 410 uses the firewall rules provided by the network manager 450 to perform path selection for each data message. In other words, path selection is based on which firewall rule a data message matches to as each firewall rule has a corresponding tunnel and SA. As each tunnel 510 has an associated SA 520, data messages received at the gateway 415 will be received at the appropriate SA without any additional routing required as also described in the embodiments above.

Many of the above-described features and applications are implemented as software processes that are specified as a set of instructions recorded on a computer-readable storage medium (also referred to as computer-readable medium). When these instructions are executed by one or more processing unit(s) (e.g., one or more processors, cores of processors, or other processing units), they cause the processing unit(s) to perform the actions indicated in the instructions. Examples of computer-readable media include, but are not limited to, CD-ROMs, flash drives, RAM chips, hard drives, EPROMs, etc. The computer-readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 6:
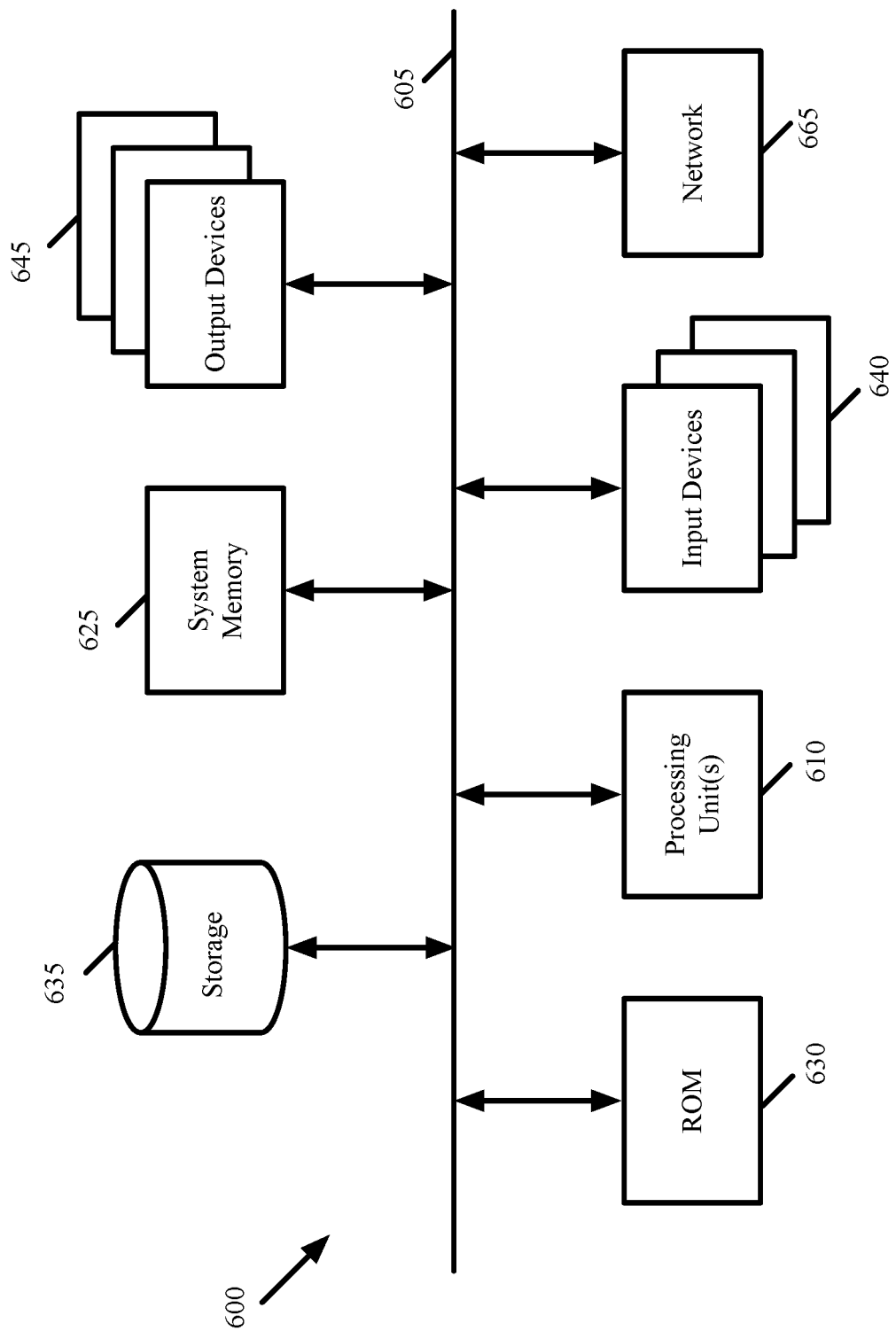
FIG. 6 conceptually illustrates a computer system with which some embodiments of the invention are implemented.

FIG. 6 conceptually illustrates a computer system 600 with which some embodiments of the invention are implemented. The computer system 600 can be used to implement any of the above-described hosts, controllers, gateway, and edge forwarding elements. As such, it can be used to execute any of the above described processes. This computer system 600 includes various types of non-transitory machine-readable media and interfaces for various other types of machine-readable media. Computer system 600 includes a bus 605, processing unit(s) 610, a system memory 625, a read-only memory 630, a permanent storage device 635, input devices 640, and output devices 645.

The bus 605 collectively represents all system, peripheral, and chipset buses that communicatively connect the numerous internal devices of the computer system 600. For instance, the bus 605 communicatively connects the processing unit(s) 610 with the read-only memory 630, the system memory 625, and the permanent storage device 635.

From these various memory units, the processing unit(s) 610 retrieve instructions to execute and data to process in order to execute the processes of the invention. The processing unit(s) 610 may be a single processor or a multi-core processor in different embodiments. The read-only-memory (ROM) 630 stores static data and instructions that are needed by the processing unit(s) 610 and other modules of the computer system 600. The permanent storage device 635, on the other hand, is a read-and-write memory device. This device 635 is a non-volatile memory unit that stores instructions and data even when the computer system 600 is off. Some embodiments of the invention use a mass-storage device (such as a magnetic or optical disk and its corresponding disk drive) as the permanent storage device 635.

Other embodiments use a removable storage device (such as a floppy disk, flash drive, etc.) as the permanent storage device. Like the permanent storage device 635, the system memory 625 is a read-and-write memory device. However, unlike storage device 635, the system memory 625 is a volatile read-and-write memory, such as random access memory. The system memory 625 stores some of the instructions and data that the processor needs at runtime. In some embodiments, the invention's processes are stored in the system memory 625, the permanent storage device 635, and/or the read-only memory 630. From these various memory units, the processing unit(s) 610 retrieve instructions to execute and data to process in order to execute the processes of some embodiments.

The bus 605 also connects to the input and output devices 640 and 645. The input devices 640 enable the user to communicate information and select commands to the computer system 600. The input devices 640 include alphanumeric keyboards and pointing devices (also called "cursor control devices"). The output devices 645 display images generated by the computer system 600. The output devices 645 include printers and display devices, such as cathode ray tubes (CRT) or liquid crystal displays (LCD). Some embodiments include devices such as touchscreens that function as both input and output devices 640 and 645.

Finally, as shown in FIG. 6, bus 605 also couples computer system 600 to a network 665 through a network adapter (not shown). In this manner, the computer 600 can be a part of a network of computers (such as a local area network ("LAN"), a wide area network ("WAN"), or an Intranet), or a network of networks (such as the Internet). Any or all components of computer system 600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application-specific integrated circuits (ASICs) or field-programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer-readable medium," "computer-readable media," and "machine-readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

The invention claimed is:

1. A method for transmitting data messages via secure tunnels in a network, the method comprising:
    at a gateway device:

determining that a first data message received at the gateway device is to be sent via a secure interface of the gateway device;

matching the first data message to a firewall rule that maps to a particular secure tunnel used by the secure interface, wherein a plurality of different firewall rules map to a plurality of different secure tunnels used by the secure interface;

encapsulating the first data message with a header that comprises an indicator value specifying the particular secure tunnel and forwarding the encapsulated first data message to a destination interface;

determining that a second data message received at the gateway device is not to be sent via the secure interface of the gateway device; and forwarding the second data message on the network via a different interface of the gateway device.

2. The method of claim 1, wherein the gateway device is a source gateway device, wherein forwarding the encapsulated data message to the destination interface comprises forwarding the encapsulated data message to the destination interface of a destination gateway device.

3. The method of claim 2, wherein the secure interface and the destination interface are virtual tunnel interfaces (VTIs).

4. The method of claim 2, wherein the plurality of different secure tunnels corresponds to a plurality of different security associations (SAs) for processing data messages at the destination interface.

5. The method of claim 1, wherein matching the data message to the firewall rule comprises matching a set of attributes of the data message to a corresponding set of attributes specified by the firewall rule.

6. The method of claim 5, wherein the set of attributes specified by the firewall rule comprises at least one of a source MAC address, a destination MAC address, a source machine tag, a destination machine tag, and a user identifier.

7. The method of claim 5, wherein the network spans datacenters of at least one cloud service provider, wherein the set of attributes specified by the firewall rule comprises a cloud service provider associated with a source of the data message.

8. A method for transmitting data messages via secure tunnels in a network, the method comprising:

at a source gateway device:
determining that a data message received at the gateway device is to be sent via a secure interface of the gateway device;

matching the data message to a firewall rule that maps to a particular secure tunnel used by the secure interface, wherein a plurality of different firewall rules map to a plurality of different secure tunnels used by the secure interface; and encapsulating the data message with a header that comprises an indicator value specifying the particular secure tunnel and forwarding the encapsulated data message to a destination gateway device, wherein the plurality of different secure tunnels corresponds to a plurality of different security associations (SAs) for processing data messages at the destination interface, wherein prior to receipt of the data message at the gateway device and during an Internet key exchange (IKE) session with the destination gateway device:
(i) negotiating a plurality of Internet protocol security (IPsec) rules, wherein the plurality of firewall rules is integrated with the plurality of IPsec rules, (ii) negotiating parameters for (1) the plurality of different secure tunnels and (2) the plurality of different SAs, and (iii) mapping (1) the plurality of different firewall rules to the plurality of different secure tunnels and (2) the plurality of different secure tunnels to the plurality of different SAs.

9. The method of claim 8, wherein prior to the IKE session, the source and destination gateway devices receive the plurality of different firewall rules from a network manager.

10. The method of claim 8, wherein the data message is received at the destination interface by a particular SA to which the particular secure tunnel maps.

11. The method of claim 10, wherein the particular SA specifies at least one action to be performed on the data message at the destination gateway device.

12. A method for transmitting data messages via secure tunnels in a network, the method comprising:

at a gateway device:
determining that a first data message received at the gateway device is to be sent via a secure interface of the gateway device;

matching the first data message to a first firewall rule that maps to a first secure tunnel used by the secure interface, wherein a plurality of different firewall rules map to a plurality of different secure tunnels used by the secure interface;

encapsulating the first data message with a header that comprises a first indicator value specifying the particular secure tunnel and forwarding the encapsulated data message to a destination interface;

determining that a second data message received at the gateway device is to be sent via the secure interface of the gateway device;

matching the second data message to a second firewall rule that maps to a second particular secure tunnel used by the secure interface; and encapsulating the second data message with a header that comprises a second indicator value specifying the second secure tunnel and forwarding the encapsulated second data message to the destination interface.

13. A non-transitory machine readable medium storing a program for execution by a set of processing units of a gateway device, the program for transmitting data messages via secure tunnels in a network, the program comprising sets of instructions for:

determining that a first data message received at the gateway device is to be sent via a secure interface of the gateway device;

matching the first data message to a firewall rule that maps to a particular secure tunnel used by the secure interface, wherein a plurality of different firewall rules map to a plurality of different secure tunnels used by the secure interface;

encapsulating the first data message with a header that comprises an indicator value specifying the particular secure tunnel and forwarding the encapsulated first data message to a destination interface;

determining that a second data message received at the gateway device is not to be sent via the secure interface of the gateway device; and forwarding the second data message on the network via a different interface of the gateway device.

14. The non-transitory machine readable medium of claim 13, wherein the gateway device is a source gateway device, wherein the set of instructions for forwarding the encapsulated data message to the destination interface comprises a set of instructions for forwarding the encapsulated data message to the destination interface of a destination gateway device.

15. The non-transitory machine readable medium of claim 14, wherein the secure interface and the destination interface are virtual tunnel interfaces (VTIs).

16. The non-transitory machine readable medium of claim 13, wherein:
    the set of instructions for matching the data message to the firewall rule comprises a set of instructions for matching a set of attributes of the data message to a corresponding set of attributes specified by the firewall rule; and
    the set of attributes specified by the firewall rule comprises at least one of a source MAC address, a destination MAC address, a source machine tag, a destination machine tag, and a user identifier.

17. The non-transitory machine readable medium of claim 13, wherein:
    the set of instructions for matching the data message to the firewall rule comprises a set of instructions for matching a set of attributes of the data message to a corresponding set of attributes specified by the firewall rule;
    the network spans datacenters of at least one cloud service provider; and
    the set of attributes specified by the firewall rule comprises a cloud service provider associated with a source of the data message.

18. A non-transitory machine readable medium storing a program for execution by a set of processing units of a source gateway device, the program for transmitting data messages via secure tunnels in a network, the program comprising sets of instructions for:
    determining that a data message received at the gateway device is to be sent via a secure interface of the gateway device;
    matching the data message to a firewall rule that maps to a particular secure tunnel used by the secure interface, wherein a plurality of different firewall rules map to a plurality of different secure tunnels used by the secure interface; and
    encapsulating the data message with a header that comprises an indicator value specifying the particular secure tunnel and forwarding the encapsulated data message to a destination gateway device,
    wherein the plurality of different secure tunnels corresponds to a plurality of different security associations (SAs) for processing data messages at the destination interface,
    prior to receipt of the data message at the gateway device and during an Internet key exchange (IKE) session with the destination gateway device:
        (i) negotiating a plurality of Internet protocol security (IPsec) rules, wherein the plurality of firewall rules is integrated with the plurality of IPsec rules,
        (ii) negotiating parameters for (1) the plurality of different secure tunnels and (2) the plurality of different SAs, and
        (iii) mapping (1) the plurality of different firewall rules to the plurality of different secure tunnels and (2) the plurality of different secure tunnels to the plurality of different SAs.

19. The non-transitory machine readable medium of claim 18, wherein prior to the IKE session, the source and destination gateway devices receive the plurality of different firewall rules from a network manager.

20. A non-transitory machine readable medium storing a program for execution by a set of processing units of a gateway device, the program for transmitting data messages via secure tunnels in a network, the program comprising sets of instructions for:
    determining that a first data message received at the gateway device is to be sent via a secure interface of the gateway device;
    matching the first data message to a first firewall rule that maps to a first secure tunnel used by the secure interface, wherein a plurality of different firewall rules map to a plurality of different secure tunnels used by the secure interface;
    encapsulating the first data message with a header that comprises a first indicator value specifying the particular secure tunnel and forwarding the encapsulated data message to a destination interface,
    determining that a second data message received at the gateway device is to be sent via the secure interface of the gateway device;
    matching the second data message to a second firewall rule that maps to a second particular secure tunnel used by the secure interface; and
    encapsulating the second data message with a header that comprises a second indicator value specifying the second secure tunnel and forwarding the encapsulated second data message to the destination interface.

* * * * *